United States Patent [19]

Yoshinouchi et al.

[11] 4,085,660

[45] Apr. 25, 1978

[54] PIVOTAL SUPPORT FOR A FLUID ACTUATED CYLINDER WITH MEANS FOR COMMUNICATING PRESSURIZED FLUID THERETO

[75] Inventors: Sumio Yoshinouchi; Hiroki Tanaka, both of Hirakata, Japan

[73] Assignee: Kabushiki Kaisha Komatsu Seisakusho, Tokyo, Japan

[21] Appl. No.: 744,927

[22] Filed: Nov. 24, 1976

[30] Foreign Application Priority Data

Dec. 25, 1975 Japan .................. 50-174379[U]

[51] Int. Cl.$^2$ ............... F01B 15/04; F01B 29/00
[52] U.S. Cl. .......................... 92/119; 92/161
[58] Field of Search ............ 92/119, 118, 66, 146, 92/161; 91/213, 176

[56] References Cited

U.S. PATENT DOCUMENTS

| 30,241 | 10/1860 | Otis | 91/176 |
|---|---|---|---|
| 172,904 | 2/1876 | Anthony | 91/213 |
| 2,790,426 | 4/1957 | Mueller | 92/119 |

FOREIGN PATENT DOCUMENTS

940,464   7/1956   Germany ................ 91/213

*Primary Examiner*—Paul E. Maslousky
*Attorney, Agent, or Firm*—Armstrong, Nikaido, Marmelstein & Kubovcik

[57] ABSTRACT

A pair of sleeves are fixedly mounted in axial alignment on opposite sides of the power plant enclosure of a bulldozer. Rotatably received in each sleeve is a trunnion having at its outer end a yoke holding one of the blade lift cylinders of the bulldozer. The pair of opposed fluid chambers in each lift cylinder are in communication with a pressurized fluid source and drain via passages formed in the respective trunnion and sleeve. For holding the trunnions in position in the respective sleeves against the axial thrust which may be applied thereto in both directions, a stop disc is bolted to the inner end of each trunnion for engagement with one of the sleeves and with a cover bolted to the inner end of each sleeve.

6 Claims, 8 Drawing Figures

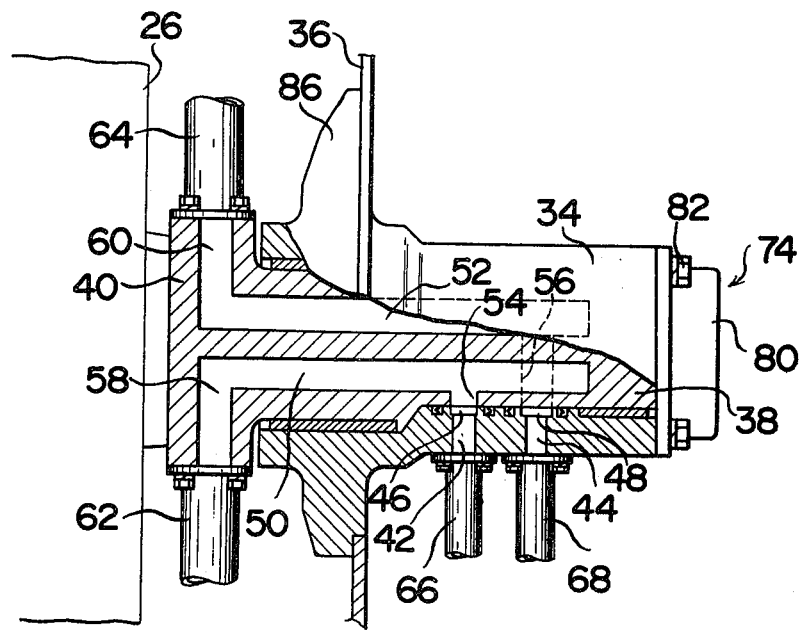
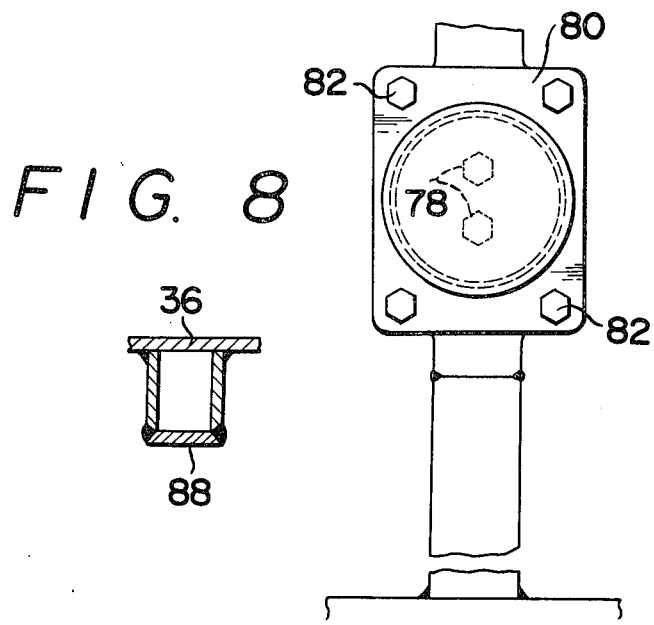

PIVOTAL SUPPORT FOR A FLUID ACTUATED CYLINDER WITH MEANS FOR COMMUNICATING PRESSURIZED FLUID THERETO

BACKGROUND OF THE INVENTION

This invention relates to a pivotal support mechanism for a fluid actuated cylinder, and more specifically to such a mechanism including means for the delivery and discharge of fluid to and from the cylinder. The invention has particular utility in conjunction with the implement actuating cylinders of construction and industrial vehicles such as the pair of blade lift cylinders of a bulldozer, but with no unnecessary limitations thereto being intended.

The pair of opposed fluid chambers in each pivoted lift cylinder of a bulldozer, for example, have usually been communicated with a pump by means of flexible conduits such as rubber hoses extending through the power plant enclosure of the vehicle. The use of such flexible conduits is disadvantageous in that they prevent the complete enclosure of the power plant. Further, such exposed flexible conduits are cumbersome and are subject to the possibility of getting hurt by the branches of trees or the like during operation of the vehicle.

A partial solution to these problems is found in Japanese Utility Model Application No. 48-15738 filed on Feb. 7, 1973 by the assignee of the instant application and laid open to public inspection on Oct. 2, 1974 (Laying-open Publication No. 49-115593). According to this prior application, each lift cylinder is fixedly mounted on a trunnion rotatably received in a stationary sleeve, and the flexible conduits are replaced by fluid passages formed in the trunnion and sleeve (as shown in FIGS. 1 and 2 of the drawings attached hereto).

This prior art device has proved to have its own drawbacks, however, in connection with the means employed for bearing the axial thrust of each trunnion. The metal particles produced frictionally by the thrust bearing surfaces cause premature damage or wear of other sliding parts located adjacently, and the entire device is in need of replacement upon wear-out of the thrust bearing surfaces, as will be later explained in further detail.

SUMMARY OF THE INVENTION

It is an object of this invention to improve a pivotal cylinder support mechanism of the type described and claimed in Japanese Utility Model Laying-open Publication No. 49-115593 and to eliminate all its drawbacks.

Another object of the invention is to provide an improved pivotal cylinder support mechanism which includes thrust bearing means so made that the metal particles produced by the galling of its mating surfaces are substantially prevented from causing premature damage or wear of other sliding parts.

A further object of the invention is to provide, in a pivotal cylinder support mechanism of the type specified, thrust bearing means which when worn out can be readily replaced without necessitating the replacement of the entire support mechanism and which permits easy adjustment of its mating surfaces.

Briefly, the invention provides a pivotal support mechanism for a fluid actuated cylinder comprising a trunnion rotatably fitted in a stationary sleeve and having at one of its ends means for securely holding the cylinder. The sleeve has formed therein a pair of first fluid passages which are in constant communication with a pair of second fluid passages, respectively, that are formed in the trunnion, and these second fluid passages are in constant communication with the respective opposed fluid chambers in the cylinder. At the other end of the trunnion there is provided thrust bearing means for holding the trunnion in position in the sleeve in spite of the axial thrust which may be applied thereto in both directions.

The above and other objects, features and advantages of this invention and the manner of attaining them will become more apparent, and the invention itself will best be understood, from the following description taken in connection with the accompanying drawings.

BRIEF DESCRIPTION OF THE DRAWINGS

FIG. 6 is a fragmentary view, partly in section, as seen in the direction of the arrow 6 in FIG. 5;

FIG. 7 is an elevational view, partly broken away, as seen in the direction of the arrow 7 in FIG. 5; and FIG. 8 is a sectional view taken along the line 8—8 of FIG. 5.

DETAILED DESCRIPTION

Figure 1:
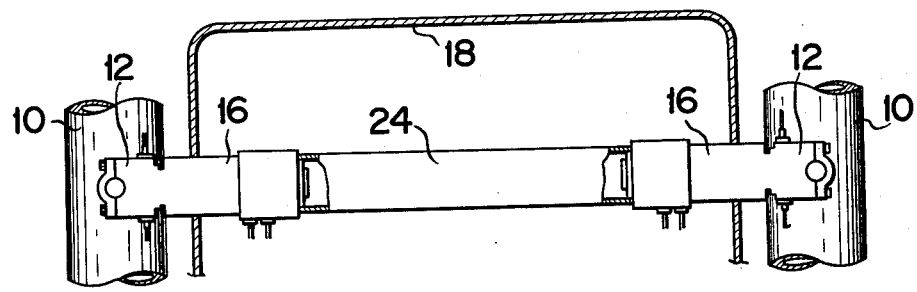
FIG. 1 is an elevational view, partly broken away, of prior art pivotal cylinder support mechanism as adapted for the lift cylinders of a bulldozer, the view including the power plant enclosure of the bulldozer which is shown in vertical section.
Figure 2:
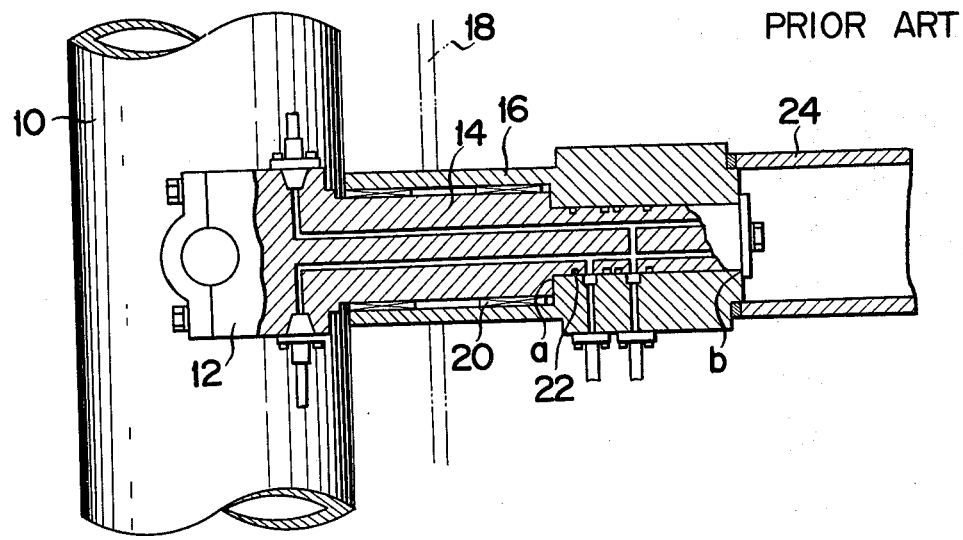
FIG. 2 is an enlarged fragmentary view, partly in section, of the arrangement of FIG. 1.

It is considered essential that the prior art pivotal cylinder support mechanism disclosed in the aforementioned Japanese Utility Model Laying-open Publication No. 49-115593 be shown and described in some more detail, the better to make clear the features and advantages of this invention. With reference therefore to FIGS. 1 and 2, there are shown at 10 a pair of lift cylinders of a bulldozer which are mounted on respective cylinder yokes 12. These cylinder yokes are formed integral with trunnions 14 which are rotatably received in respective sleeves 16 mounted in axial alignment on opposite sides of the power plant enclosure 18 of the bulldozer.

This prior art pivotal cylinder support mechanism has disadvantages arising from the fact that the axial thrust of each trunnion 14 in both directions is borne by the surfaces a and b, FIG. 2, of the respective sleeve 16. Since the thrust bearing surface a, in particular, is located midway between both ends of the sleeve 16, it area is inevitably rather narrowly limited. Further, the metal particles produced by the galling of the contacting surfaces tend to cause premature damage or wear in bearing 20, seal 22 and other parts. Upon wear-out of the thrust bearing surfaces a and b, moreover, the entire support mechanism must be replaced.

An additional disadvantage of the illustrated prior art pivotal cylinder support mechanism resides in a tube 24 extending linearly between the pair of sleeves 16 within the enclosure 18 for reinforcement purposes. This reinforcing tube significantly reduces the enclosed space for the power plant of the vehicle and interferes with its maintenance.

All these disadvantages of the prior art are thoroughly overcome by this invention, which is shown in FIGS. 3 through 8 as adapted specifically for a pair of lift cylinders of a bulldozer.

Figure 3:
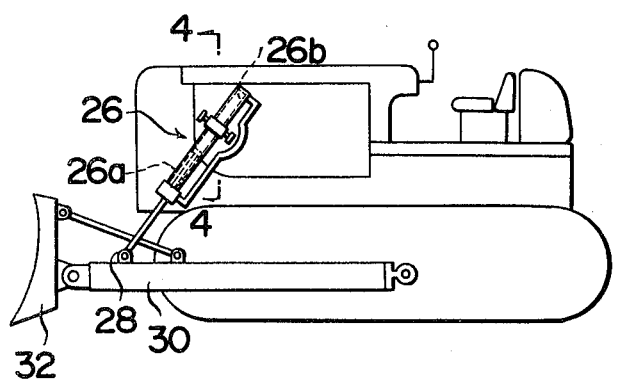
FIG. 3 is a schematic side elevational view of a bulldozer to which the present invention is directed specifically.

FIG. 3 illustrates a track-type bulldozer having a pair of lift cylinders 26 (one seen). As is well known, the piston rods of these lift cylinders are pivotally bracketed at 28 to a pair of push beams 30 (one seen), respectively, that carry a bulldozer blade 32.

Figure 4:
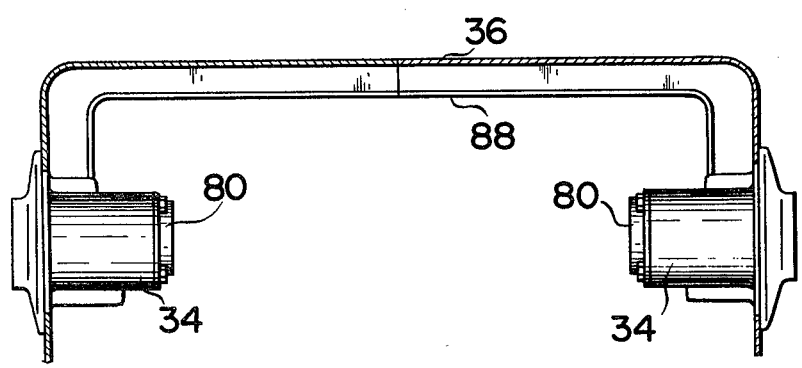
FIG. 4 is a schematic sectional view taken along the line 4—4 of FIG. 3 and showing a preferred form of the pivotal cylinder support mechanism according to the invention.
Figure 5:
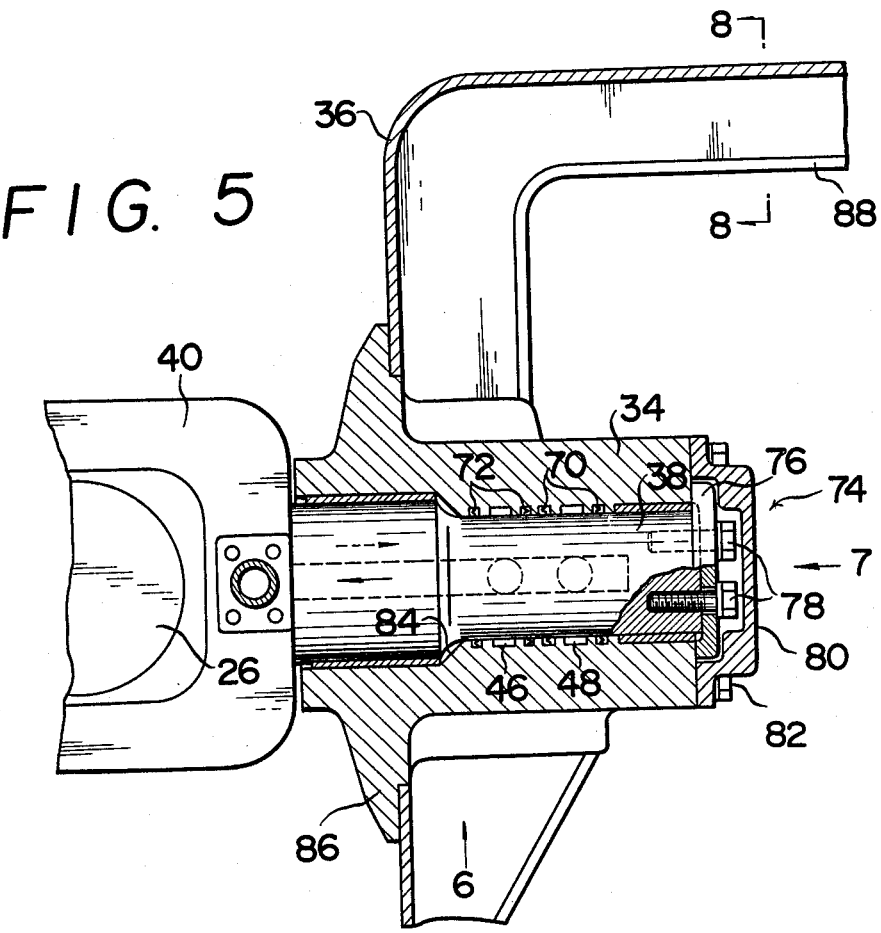
FIG. 5 is an enlarged fragmentary view, partly in section, of the arrangement of FIG. 4.

As will be seen from FIGS. 4 through 6, a pair of sleeves 34 are fixedly mounted in axial alignment on the opposite sides of an enclosure 36 for the power plant of the bulldozer. Rotatably fitted in each sleeve 34 is a trunnion 38 terminating at its outer end (left hand as viewed in FIGS. 5 and 6) in a cylinder yoke 40 securely holding the respective lift cylinder 26. The pair of lift cylinders 26 are therefore pivotable relative to the sleeves 34 and the enclosure 36.

For the desired fluid communication to and from a pair of opposed fluid chambers 26a and 26b (FIG. 3) in each lift cylinder 26, each sleeve 34 has a pair of first fluid passages 42 and 44 formed radially therein. These first fluid passages 42 and 44 are open to a pair of annular grooves 46 and 48, respectively, formed on the inside surface of the sleeve 34. Each trunnion 38 has a pair of second fluid passages 50 and 52 formed longitudinally therein, which are in constant communication, on the one hand, with the respective first fluid passages 42 and 44 via passages 54 and 56 formed in the trunnion and the annular grooves 46 and 48 in the sleeve 34. On the other hand, the pair of second fluid passages 50 and 52 are in constant communication with the respective fluid chambers 26a and 26b of the lift cylinder 26 via passages 58 and 60 formed in the cylinder yoke 40 and conduits 62 and 64 extending from the yoke. Shown at 66 and 68 in FIG. 6 are a pair of conduits communicating the first fluid passages 42 and 44 in each sleeve 34 with a source of pressurized fluid and a fluid reservoir, both not shown, via suitable valving.

Thus, the pressurized fluid supplied from the conduit 66, for example, flows into one of the fluid chambers in one of the lift cylinders 26 by way of the first passage 42, the annular groove 46, the passages 54, 50 and 58, and the conduit 62. The fluid forced out of the other fluid chamber in the lift cylinder 26 flows into the conduit 68 by way of the conduit 64, the passages 60, 52 and 56, the annular groove 48, and the passage 44. As will be apparent, the fluid chambers 26a and 26b of each lift cylinder 26 can be communicated with the source or drain regardless of the angular position of the trunnion 38 relative to the sleeve 34.

As best shown in FIG. 5, each sleeve 34 has formed in its inside surface a pair of additional annular grooves 70 which are disposed on both sides of each of the aforesaid annular grooves 46 and 48. A sealing ring 72 is fitted in each annular groove 70 for preventing fluid leakage.

The reference numeral 74 in FIGS. 5 and 6 generally designates thrust bearing means provided at the inner end of each trunnion 38 for holding same in position within one of the sleeves 34 against the axial thrust which may be applied to the trunnion in both directions during operation of the bulldozer. As will be seen also from FIGS. 5 and 7, the thrust bearing means 74 comprises a stop disc 76 bolted at 78 to the inner end of each trunnion 38, and a cover 80 also bolted at 82 to the inner end of each sleeve 34 so as to enclose the stop disc 76.

Greater in diameter than the trunnion 38, the stop disc 76 is engageable with the inner end of the sleeve 34 to bear the axial thrust of the trunnion in the outward direction (indicated by the solid arrow in FIG. 5) relative to the sleeve. The axial thrust of the trunnion 38 in the inward direction (indicated by the dashed arrow in FIG. 5), on the other hand, is borne by the stop disc 76 as same is forced against the cover 80.

It should be noted that the thrust bearing means 74 is provided only at the inner end of each trunnion 38 and is effective to bear its two-way axial thrust. The metal particles produced by the galling of the working surfaces of the thrust bearing means 74 will not easily damage other sliding parts. Further, since both stop disc 76 and cover 80 of the thrust bearing means are mounted in their positions by bolting, they are readily replaceable when worn out, and their contacting surfaces are easily adjustable into working order.

If desired, the inside diameter of each sleeve 34 may be made greater at its outer end portion that at its inner end portion, with a tapering step 84 formed therebetween, as seen most clearly in FIG. 5. In this case each trunnion 38 should be shaped correspondingly. Each sleeve 34 can be flanged at 86 for engagement with the power plant enclosure 36.

According to a further feature of this invention, a generally U-shaped reinforcing rib 88 is secured to the inside surface of the power plant enclosure 36 of the bulldozer so as to extend between the pair of sleeves 34 as best shown in FIG. 4. As will be seen from FIG. 8, the reinforcing rib 88 is of U-shaped cross section and has its open side attached to the inside surface of the power plant enclosure. The U-shaped reinforcing rib 88 is well calculated to improve the maintainability of the enclosed power plant or the like and to permit easy replacement or other servicing of the thrust bearing means 74.

While the present invention has been shown and described with reference to the lift cylinders of a bulldozer, it will be apparent that it can be utilized elsewhere and that various modifications or changes might be made that would fall within the scope of the invention, which is not intended to be limited except as defined in the following claims.

What we claim is:

1. A pivotal support mechanism for a fluid actuated cylinder, said fluid actuated cylinder having piston means forming a pair of opposed fluid chambers, comprising in combination:

a stationary sleeve;

a first pair of fluid passages formed in said stationary sleeve;

a trunnion rotatably received in said stationary sleeve;

a second pair of fluid passages formed in said trunnion;

a pair of annular grooves formed in an inner peripheral surface of said stationary sleeve, wherein each of said second pair of fluid passages is in respective constant fluid communication with a respective one of said first pair of fluid passages through a respective one of said pair of annular grooves and is further in constant fluid communication with a respective one of said pair of opposed fluid chambers in said fluid actuated cylinder;

means formed at one end of said trunnion for securely holding said fluid actuated cylinder; and thrust bearing means at the other end of said trunnion for holding said trunnion in position in said stationary sleeve against axial thrust which may be applied to said trunnion in either axial direction.

2. The pivotal support mechanism as recited in claim 1, wherein said thrust bearing means comprises:

a stop member affixed to said other end of said trunnion so as to be engageable with said sleeve for preventing the axial displacement of said trunnion in one direction relative to said sleeve; and a cover affixed to said sleeve so as to engage said stop member for preventing therethrough the axial displacement of said trunnion in a direction opposite to said one direction relative to said sleeve.

3. The pivotal support mechanism as recited in claim 2, wherein said stop member and said cover are affixed to said trunnion and to said sleeve, respectively, in a readily detachable manner.

4. In a vehicle having a pair of fluid actuated cylinders, each fluid actuated cylinder having piston means forming a pair of opposed fluid chambers, the combination comprising:

frame means;

a pair of sleeves fixedly mounted on opposite sides of said frame means;

a first pair of fluid passages formed in each of said sleeves;

a trunnion rotatably received in each of said sleeves;

a second pair of fluid passages formed in each of said trunnions;

a pair of annular grooves formed in an inner peripheral surface of each of said fixedly mounted sleeves, wherein each of said second pair of fluid passages is in respective constant fluid communication with a respective one of said first pair of fluid passages through a respective one of said pair of annular grooves and is further in constant fluid communication with a respective one of said pair of fluid chambers in each of said cylinders;

means formed at an outer end of each of said trunnions for securely holding one of said fluid actuated cylinders; and thrust bearing means at an inner end of each of said trunnions for holding the respective trunnion in position in a respective one of said sleeves against axial thrust which may be applied to said trunnions in either axial direction.

5. The combination as recited in claim 4, wherein said thrust bearing means comprises:

a stop member removably mounted on the inner end of each said trunnion so as to be engageable with one of said sleeves for preventing the axial displacement of each said trunnion in the outward direction relative to one of said sleeves; and a cover removably mounted on each said sleeve so as to engage one of said stop members for preventing therethrough the axial displacement of each said trunnion in the inward direction relative to one of said sleeves.

6. The combination as recited in claim 4, wherein said frame means is a power plant enclosure of the vehicle, and wherein the combination further comprises U-shaped reinforcing rib means secured to the inside surface of said power plant enclosure so as to extend between said pair of sleeves.

* * * * *